United States Patent
Bruck et al.

(10) Patent No.: US 9,808,885 B2
(45) Date of Patent: Nov. 7, 2017

(54) METHOD FOR FORMING THREE-DIMENSIONAL ANCHORING STRUCTURES ON A SURFACE

(71) Applicant: Siemens Energy, Inc., Orlando, FL (US)

(72) Inventors: Gerald J. Bruck, Oviedo, FL (US); Ahmed Kamel, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 453 days.

(21) Appl. No.: 14/017,337

(22) Filed: Sep. 4, 2013

(65) Prior Publication Data
US 2015/0064407 A1 Mar. 5, 2015

(51) Int. Cl.
*B23K 26/00* (2014.01)
*B23K 26/06* (2014.01)
(Continued)

(52) U.S. Cl.
CPC ...... *B23K 26/0081* (2013.01); *B23K 26/0006* (2013.01); *B23K 26/0078* (2013.01); *B23K 26/0084* (2013.01); *B23K 26/0608* (2013.01); *B23K 26/0622* (2015.10); *F01D 5/288* (2013.01); *B23K 2201/001* (2013.01); *B23K 2203/02* (2013.01); *B23K 2203/50* (2015.10);
(Continued)

(58) Field of Classification Search
CPC ............ B23K 26/0081; B23K 26/0622; B23K 26/0006; B23K 26/0078; B23K 26/0084; B23K 26/0608; B23K 2203/50; B23K 2203/02; B23K 2201/001; F01D 5/288; Y10T 428/24479; F05D 2230/90

USPC ......................................................... 427/555
See application file for complete search history.

(56) References Cited

U.S. PATENT DOCUMENTS 4,299,860 A 11/1981 Schaefer et al.
4,884,820 A * 12/1989 Jackson et al. ............... 277/415
(Continued)

FOREIGN PATENT DOCUMENTS

DE 102011113246 A1 1/2013
WO 2010146977 A1 12/2010
WO 2012150413 A1 11/2012

OTHER PUBLICATIONS

Latif et al., "Microstructural Morphological Changes in Laser Irradiated Platinum", Journal of Modern Physics, 2011, 2, pp. 875-884, doi: 10.4236/jmp.2011.28104 Published Online Aug. 2011, Pakistan.
(Continued)

*Primary Examiner* — Katherine A Bareford
*Assistant Examiner* — Christina McClure

(57) ABSTRACT

A method for forming three-dimensional anchoring structures on a surface is provided. This may result in a thermal barrier coating system exhibiting enhanced adherence for its constituent coatings. The method involves applying a laser beam (10) to a surface (12) of a solid material (14) to form a liquefied bed (16) on the surface of the solid material, then applying a pulse of laser energy (18) to a portion of the liquefied bed to cause a disturbance, such as a splash (20) or a wave (25) of liquefied material outside the liquefied bed. A three-dimensional anchoring structure (22) may thus be formed on the surface upon solidification of the splash or wave of liquefied material.

7 Claims, 2 Drawing Sheets

(51) Int. Cl.
  *F01D 5/28* (2006.01)
  *B23K 26/0622* (2014.01)
  *B23K 101/00* (2006.01)
  *B23K 103/02* (2006.01)
  *B23K 103/00* (2006.01)

(52) U.S. Cl.
  CPC ... *F05D 2230/90* (2013.01); *Y10T 428/24479* (2015.01)

(56) References Cited

U.S. PATENT DOCUMENTS

| | | |
|---|---|---|
| 5,419,971 A * | 5/1995 | Skelly et al. ............... 428/612 |
| 5,723,078 A | 3/1998 | Nagaraj et al. |
| 5,759,640 A | 6/1998 | Mannava et al. |
| 6,471,881 B1 | 10/2002 | Chai et al. |
| 7,094,450 B2 | 8/2006 | Nagaraj et al. |
| 2004/0081760 A1 | 4/2004 | Burns et al. |
| 2012/0111841 A1* | 5/2012 | Murison et al. ......... 219/121.71 |
| 2013/0078423 A1 | 3/2013 | Sutou et al. |

OTHER PUBLICATIONS

Leitz,, "Metal Ablation with Short and Ultrashort Laser Pulses", ScienceDirect, Physics Procedia 12 (2011), pp. 230-238, Erlangen, Germany.

\* cited by examiner

2

METHOD FOR FORMING THREE-DIMENSIONAL ANCHORING STRUCTURES ON A SURFACE

FIELD OF THE INVENTION

Aspects of the present invention relate to thermal barrier coating systems for components exposed to high temperatures, such as encountered in the environment of a combustion turbine engine. More particularly, aspects of the present invention are directed to techniques which may involve laser irradiation for forming three-dimensional anchoring structures on a surface, and may result in a thermal barrier coating system exhibiting enhanced adherence for its constituent coatings.

BACKGROUND OF THE INVENTION

It is known that the efficiency of a combustion turbine engine improves as the firing temperature of the combustion gas is increased. As the firing temperatures increase, the high temperature durability of components of the turbine must increase correspondingly. Although nickel and cobalt based superalloy materials may be used for components in the hot gas flow path, such as combustor transition pieces and turbine rotating and stationary blades, even these superalloy materials are not capable of surviving long term operation at temperatures that sometimes can exceed 1,400 degrees C. or more.

In many applications, a metal substrate is coated with a ceramic insulating material, such as a thermal barrier coating (TBC), to reduce the service temperature of the underlying metal and to reduce the magnitude of temperature transients to which the metal is exposed. TBCs have played a substantial role in realizing improvements in turbine efficiency. However, one basic physical reality that cannot be overlooked is that the thermal barrier coating will only protect the substrate so long as the coating remains substantially intact on the surface of a given component through the life of that component.

High stresses that may develop due to high velocity ballistic impacts by foreign objects and/or differential thermal expansion can lead to damage and even total removal of the TBC (spallation) from the component. It is known to control a roughness parameter of a surface in order to improve the adhesion of an overlying thermal barrier coating. U.S. Pat. No. 5,419,971 describes a laser ablation process where removal of material by direct vaporization (e.g., without melting of material) is purportedly used to form three-dimensional features at the surface being irradiated. See col. 6, line 3. Thus, such features are generally limited to patterns at the surface being irradiated (e.g., do not generally form structures extending outside the surface) and thus processes that can provide improved structural formations conducive to enhanced adhesion are needed.

BRIEF DESCRIPTION OF THE DRAWINGS

The invention is explained in the following description in view of the drawings that show.

DETAILED DESCRIPTION OF THE INVENTION

In accordance with one or more embodiments of the present invention, structural arrangements and/or techniques conducive to formation of three-dimensional anchoring structures on a surface exposed to controlled laser irradiation are described herein. In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent unless otherwise do described. Moreover, repeated usage of the phrase "in one embodiment" does not necessarily refer to the same embodiment, although it may. Lastly, the terms "comprising", "including", "having", and the like, as used in the present application, are intended to be synonymous unless otherwise indicated.

Figure 1:
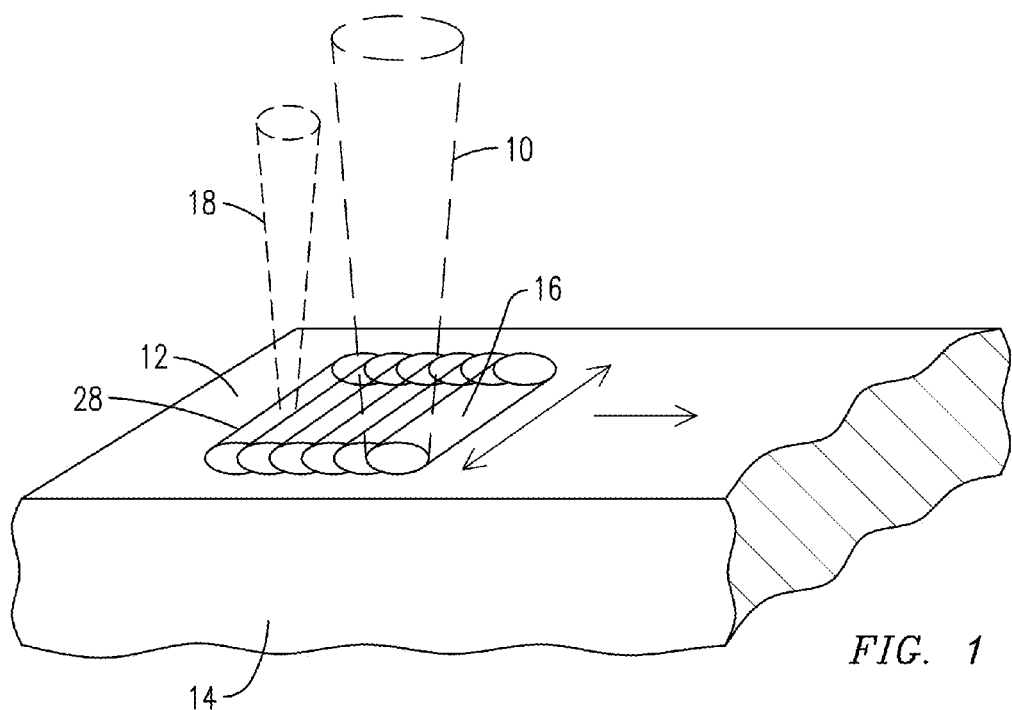
FIG. 1 is an isometric view of a solid material being irradiated with laser irradiation controlled in accordance with aspects of the present invention.
Figure 2:
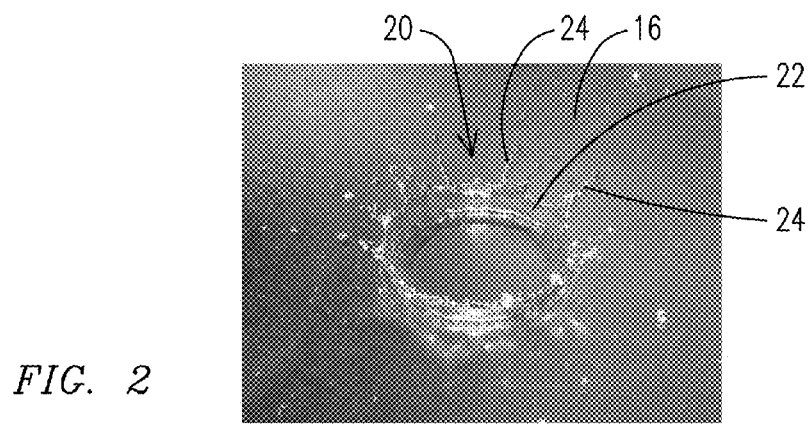
FIG. 2 is an isometric view of an example splash of liquefied material which, in accordance with aspects of the present invention, allows forming on the surface of the solid material a three-dimensional anchoring structure upon solidification of the splash of liquefied material.

The inventors of the present invention propose innovative utilization of laser irradiation to form three-dimensional anchoring structures on a surface. In one non-limiting embodiment, as shown in FIG. 1, a laser beam 10 may be applied to a surface 12 of a solid material 14 to form a liquefied bed 16 of the material on the surface of the solid material. For example, laser beam 10 may be arranged to melt a relatively shallow layer on the surface of the solid material. Before solidification of liquefied bed 16, a pulse of laser energy 18 may be applied to at least a portion of the liquefied bed to cause a disturbance in the liquefied bed. In one non-limiting embodiment, such a disturbance may comprise a splash 20 (FIG. 2) of liquefied material outside the liquefied bed.

The laser beam 10 may be defocused or have a sufficiently low and controlled power density to cause melting to only a desired and controlled depth. The pulse of laser energy 18 may be a focused pulse having a sufficiently high power density to cause a disruption (splash 20 (FIG. 2; or a wave 25 (FIG. 3)) in the liquefied bed 16, such as due to localized flash evaporation of the material. In one non-limiting embodiment, a typical energy density for general, broad area melting may range from approximately 3 kJ/cm² to approximately 10 kJ/cm². For disruption, pulses of focused energy may be involved. In one non-limiting embodiment, such pulses may comprise parameters having respective ranges typical of laser ablation processing. Karl-Heinz Leitz et al in a paper titled "Metal Ablation with Short and Ultrashort Laser Pulses", published in Physics Procedia, Vol. 12, 2011, pages 230-238, has summarized such ranges in parameters as follows:

| Pulse | Applied Power | Pulse Energy | Peak Fluence | Focus Radius |
|---|---|---|---|---|
| 80 micro-s | 44 w | 90 milli-J | 200 micro-m | 140 J/cm² |
| 60 nano-s | 34 w | 280 micro-J | 20 micro-m | 45 J/cm² |
| 10 pico-s | 7.5 w | 150 micro-J | 40 micro-m | 6 J/cm² |
| 170 femto-s | 300 micro-w | 300 micro-J | 30 micro-m | 23 J/cm² |

Figure 3:
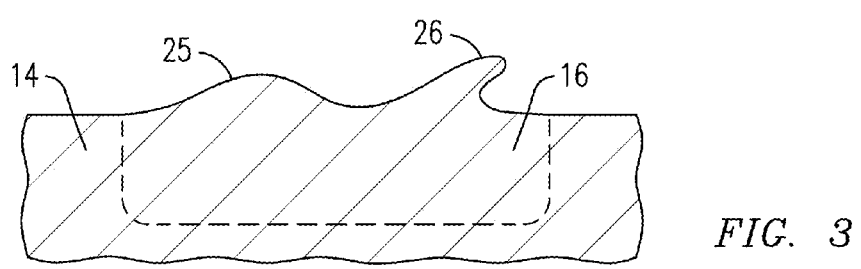
FIG. 3 is a partial cross-sectional view of a non-limiting example of anchoring structures such as an undulation or a hook formed on the surface of the solid material.

The two applications of laser energy may be delivered by different lasers or by the same laser controlled to vary its energy density and/or focus. This may be conceptually analogized to a rock (high-energy pulse) being dropped onto a pool of water (liquefied bed). This disruption of the liquefied bed (e.g., splash, wave) allows forming on the surface of the solid material a three-dimensional anchoring structure 22 upon solidification of the splash or wave of liquefied material prior to it returning to the liquid pool level. Three-dimensional anchoring structure 22 may include at least one finger 24 (FIG. 2), hook 26 or wave 25 (FIG. 3).

The distortion (e.g., splash, wave) of liquefied material in liquefied bed 16 could be generated by a pulse of energy other than laser energy, such as ultrasonic energy, mechanical energy (e.g., a puff of air, a solid object), etc.

The foregoing process may be iteratively performed throughout surface 12 to form a large number of three-dimensional anchoring structures 22 on such a surface. Moreover, three-dimensional anchoring structures 22 may be selectively distributed throughout surface 12. For example, surface regions expected to encounter a relatively large level of stress may be engineered to include a larger number of three-dimensional anchoring structures 22 per unit area compared to surface regions expected to encounter a relatively lower level of stress.

In one non-limiting embodiment, laser beam 10 may be applied to surface 12 of solid material 14 by way of a beam-scanning technique (e.g., two-dimensional scanning) of laser beam 10 of the surface of the solid material, as represented by scanning grids 28. Relative movement of surface 12 with respect to a stationary laser beam 10 would be another alternative to provide beam scanning. It will be appreciated that laser beam 10 need not be applied by way of a beam-scanning technique. For example, a non-scanning laser beam (e.g., from a diode laser) may be used to form liquefied bed 16. The pulse of laser energy 18 may be applied to the portion of the liquefied bed subsequent to the applying of laser beam 10 to the surface of the solid material. In an alternative embodiment, the pulse of laser energy 18 may be interspersedly applied during the applying of laser beam 10 to the surface of the solid material. For example, at a certain time during a scan, the pulse of laser energy 18 may be focused onto a given spot of liquefied bed 16 expected to re-solidify soon to cause a splash at the given spot and thus forming on the surface of the solid material the three-dimensional anchoring structure 22 upon solidification of the splash of liquefied material. The process may be applied continuously across the surface 12 by transiting laser beam 10 across the surface (or relative movement there between) to form a continuously moving melt pool 16, with the pulsed energy 18 being repeatedly applied proximate the moving trailing edge of the melt pool 16 just before the material re-solidifies, effective to create a respective plurality of anchoring structures across the surface as the pool moves and the surface re-solidifies. One skilled in the art will appreciate that the two sources of energy 10, 18 may be controlled to achieve a desired pool depth and a desired timing of the splash 20 relative to re-solidification.

It is contemplated that one may control environmental conditions using a suitable enclosure while performing the foregoing laser irradiation process. For example, depending on the needs of a given application, one may choose to perform the laser irradiation process under vacuum conditions in lieu of atmospheric pressure, or one may choose to introduce an inert gas in lieu of air. Fluxes represent still another alternative to use of inert shielding gas.

Figure 4:
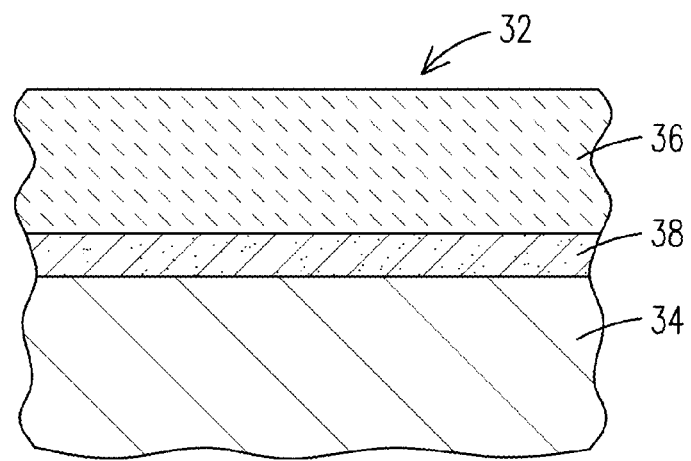
FIG. 4 is a partial cross-sectional view of an example gas turbine component including a thermal barrier coating system, which may benefit from a method embodying aspects of the present invention.

In one non-limiting application, a method embodying aspects of the present invention may be used to construct (or to repair) a thermal barrier coating system, which may be used to thermally protect a component 32 (FIG. 4) (e.g., a blade, a vane, etc.) operating in the high-temperature environment of a gas turbine engine. Component 32 may comprise a metal substrate 34 (e.g., a superalloy) covered by a barrier coating such as a layer of a ceramic thermal barrier coating (TBC) 36 for use in the high temperature environment of the turbine engine. As would be readily appreciated by one skilled in the art of TBC coatings, a bond coat 38 (e.g., a MCrAlY material) may be deposited on substrate 34 prior to the application of TBC 36 to improve the adherence of coating 36 to substrate 34. It will be appreciated that aspects of the present invention are not limited to the example coating arrangement shown in FIG. 4 nor are such aspects limited to components having a TBC coating.

In one non-limiting application, the surface of the solid material being subjected to laser irradiation to form three-dimensional anchoring structures on its surface may be metal substrate 34. Upon formation of such three-dimensional anchoring structures, one may then deposit a layer of bond coating 38 on the surface of the metal substrate including the three-dimensional anchoring structures. Thus, in this application, the bond coating may be anchored by three-dimensional anchoring structures (e.g., superalloy anchors), which would be metallurgically integral with the substrate 34.

In another non-limiting application, the surface of the solid material being subjected to laser irradiation to form three-dimensional anchoring structures on its surface may be bond coating 38. Upon formation of such three-dimensional anchoring structures, one may then deposit a layer of TBC 36 on the surface of the bond coating including the three-dimensional anchoring structures. Thus, in this application, the TBC 36 may be anchored by three-dimensional anchoring structures (e.g., bond coating anchors), which would be metallurgically integral with the bond coating 36.

In yet another non-limiting application, the respective surfaces of the metal substrate and then the bond coating may be subjected to respective laser irradiation to form three-dimensional anchoring structures on both such surfaces. For example, the surface of metal substrate 34 may be first subjected to laser irradiation to form three-dimensional anchoring structures on its surface. A layer of bond coating 38 would then be deposited on the surface of the metal substrate including the three-dimensional anchoring structures. One may then subject the surface of bond coating 38 to laser irradiation to form three-dimensional anchoring structures on its surface, typically not directly on top of the anchoring structures formed in the metal substrate 34. Lastly, one may then deposit a layer of TBC 36 on the surface of the bond coating including the three-dimensional anchoring structures. Thus, in this application, the bond coating may be anchored by three-dimensional anchoring structures (e.g., superalloy anchors), which would be metallurgically integral with the substrate 34. Additionally, TBC 36 would be anchored by three-dimensional anchoring structures (e.g., bond coating anchors), which would be metallurgically integral with the bond coating 38.

Figure 5:
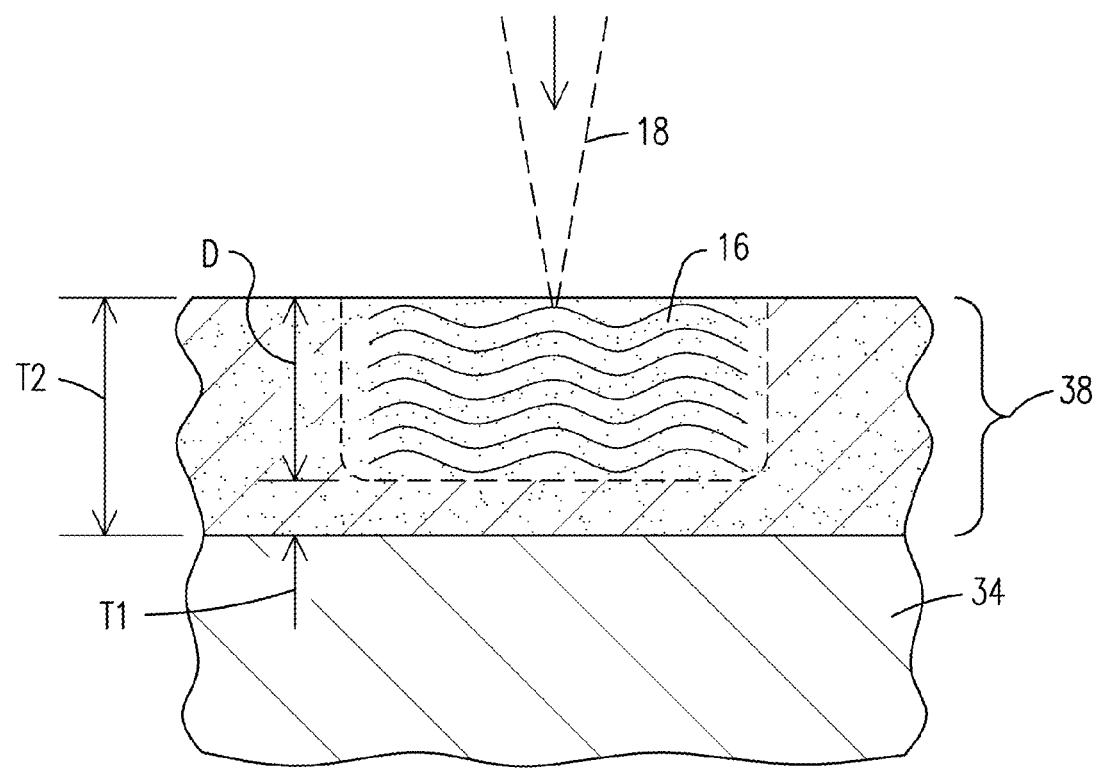
FIG. 5 is a partial cross-sectional view of a thermal barrier coating system, where the surface of a bond coating may be subjected to laser irradiation in accordance with further aspects of the present invention.

In one non-limiting embodiment, as illustrated in FIG. 5, presuming the surface of the solid material being subjected to laser irradiation to form three-dimensional anchoring structures on its surface is bond coating 38, it may be desirable that the depth (D) of liquefied bed 16 be controlled so that liquefied bed 16 not extend into substrate 34. For example, a layer (T1) of solid bond coating 38 (e.g., unmelted layer of bond coating 38) should remain between the bottom surface of liquefied bed 16 and the boundary with substrate 34. In one non-limiting embodiment, the thickness (T2) of bond coating 38 may range from approximately 150 micro-m to approximately 300 micro-m and the unmelted layer T1 may range from approximately 10% to approximately 50% of thickness T2.

While various embodiments of the present invention have been shown and described herein, it will be apparent that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
    applying a laser beam to a surface of a solid material to form a liquefied bed on the surface of the solid material;
    applying a pulse of laser energy to at least a portion of the liquefied bed to cause a splash of liquefied material outside the liquefied bed; and
    forming on the surface of the solid material a three-dimensional anchoring structure upon solidification of the splash of liquefied material;
    wherein the applying of the pulse of laser energy to the portion of the liquefied bed is performed subsequent to the applying of the laser beam to the surface of the solid material; and
    wherein the applying of the laser beam to the surface of the solid material comprises a scanning by the laser beam over the surface of the solid material.

2. A method comprising:
    delivering a pattern of energy scanning a surface of a solid material to create a moving pool of liquefied material which re-solidifies along a trailing edge; and
    repeatedly impacting the moving pool of liquefied material with respective pulses of energy effective to create a respective plurality of anchoring structures across the surface as the pool moves and the surface re-solidifies.

3. The method of claim 2, wherein the solid material is a bond coat of a thermal barrier coating system, and further comprising controlling the moving pattern of energy such that a depth of the moving pool is less than a thickness of the bond coat.

4. The method of claim 2, wherein the pattern of energy comprises laser energy.

5. The method of claim 2, wherein the pulses of energy comprise laser energy.

6. The method of claim 2, wherein the repeatedly impacting with respective pulses of energy to the moving pool is performed subsequent to the delivering of the pattern of energy to the surface of solid material.

7. A method comprising:
    applying a laser beam to a surface of a solid material to form a liquefied bed on the surface of the solid material;
    applying a pulse of laser energy to at least a portion of the liquefied bed to cause a splash of liquefied material outside the liquefied bed; and
    forming on the surface of the solid material a three-dimensional anchoring structure upon solidification of the splash of liquefied material;
    wherein the applying of the pulse of laser energy to the portion of the liquefied bed is performed subsequent to the applying of the laser beam to the surface of the solid material; and
    further comprising depositing a layer on the surface of the solid material and anchoring the layer by the three-dimensional anchoring structure.

* * * * *